UNITED STATES PATENT OFFICE.

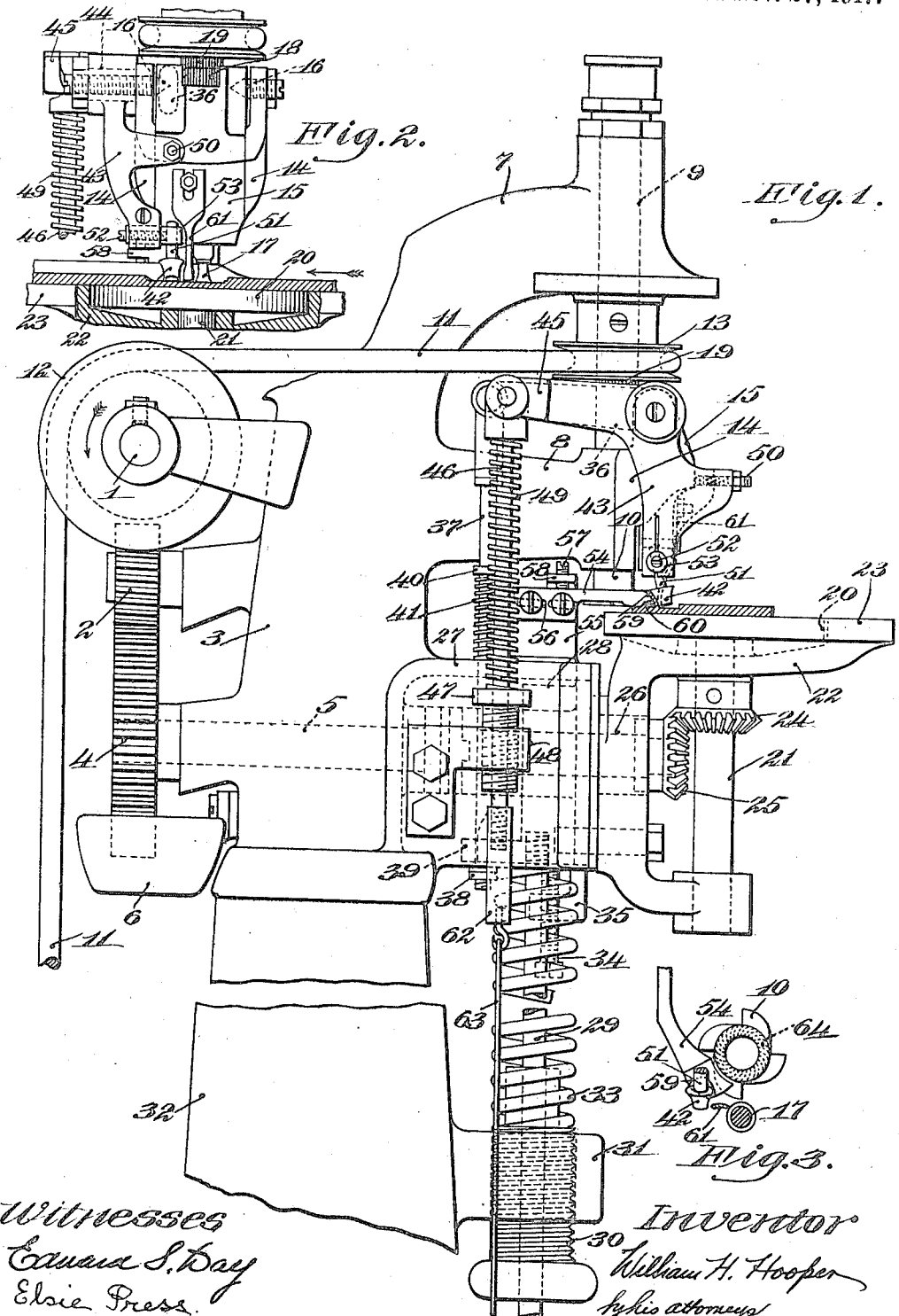

WILLIAM H. HOOPER, OF LYNN, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING ON INSOLES.

1,247,836.  Specification of Letters Patent.  Patented Nov. 27, 1917.

Application filed May 17, 1913. Serial No. 768,222.

*To all whom it may concern:*

Be it known that I, WILLIAM H. HOOPER, a citizen of the United States, residing at Lynn, in the county of Essex and State of Massachusetts, have invented certain new and useful Improvements in Machines for Operating on Insoles; and I do hereby declare the following to be a full, clear, and exact description of the invention, such as will enable others skilled in the art to which it appertains to make and use the same.

This invention relates to stock fitting machines for use in the manufacture of boots and shoes and more particularly to lip turning machines especially adapted for preparing insoles for the application thereto of a suitable reinforcing fabric.

Reinforced insoles are of several kinds. Two main distinctions in their construction may be made, i. e., those in which a marginal lip is produced by cutting inwardly from the outer edge of the insole for reinforcing, and those in which a marginal lip is produced by cutting downwardly and outwardly toward the edge of the insole. Frequently both lips are cut in the same sole and are then upturned to form a compound rib for reinforcing.

The present invention relates primarily, although not necessarily, to the preparation of insoles of the second type mentioned and its principal object is to upturn the previously cut lip, and set it in a proper upturned position for the ready application of the reinforcing fabric across the face of the insole, within it. To prepare the insole for a proper application of the fabric the lip should be so set that, after the insole leaves the lip turning machine, it does not overhang the channel which is produced in cutting it, that is, the lip should stand away from the channel so as to provide for a free and easy preliminary placing of the fabric entirely across the insole and the later tucking of the fabric tightly in at the base of the lip where a secure contact with the insole is essential to prevent "cripples" caused by the needle of the welt sewing machine tearing the fabric off of the insole instead of piercing it cleanly. To the accomplishment of this object a feature of the invention contemplates the provision in a lip turning machine of a lip setting tool constructed and arranged to act on the inner side of the lip after the action thereon of an appropriate lip turning tool, the construction and arrangement being such that after the setting tool has acted on the lip, the lip is left curled outwardly over the margin of the insole outside of the channel, leaving the angle at its inner side entirely free and open for manipulation of the reinforcing fabric in the process of its application to the insole.

Those skilled in the art will readily recognize that this feature of the invention is not limited in its application to use in setting the lip of a single lipped insole but is equally useful in setting the inner lip of a two-lipped insole.

Further features of the invention relate to certain constructions and combinations of parts by means of which the proper setting of the lip throughout its length is accomplished, as will be apparent to those skilled in the art from the following description.

To the accomplishment of the object above set forth the invention comprises the features and combinations of parts hereinafter described and then set forth in detail in their true scope in the appended claims.

The preferred form of the invention is shown in the accompanying drawings, in which, Figure 1 is a rear elevation of the machine;

Fig. 2 is a front elevation of the tools for operating on the inner lip, the sole which is shown on the sole support being cut away to better show the tools;

Fig. 3 is a detail showing the relationship of the tools to each other in plan.

In the embodiment of the invention illustrated in drawings 1 is a shaft on which there is mounted a worm which drives an idle gear 2, mounted on a stud shaft projecting from the main frame 3, which meshes with a gear 4 mounted on the rear end of a horizontal shaft 5 by means of which a rotary motion is imparted to the sole support to feed the insole, as will be described later. Mounted on the frame 3 beneath the gear 4 is an oil cup 6 to receive the drippings from the gears. The frame 3 is provided with three forwardly projecting arms, the upper two, 7 and 8, of which provide bearings for a vertical shaft 9, on the lower end of which there is mounted a lip turning tool 10 for turning the outer lip of a double lipped insole. The vertical shaft 9 is driven by means of a belt 11 extending upwardly from a suitable source of power over pulleys 12 on the shaft 1 and about a pulley 13 secured to the shaft 9. The projecting arm 8 from the frame is provided with two side arms 14 (Fig. 2) between which there is mounted a frame 15 adapted to swing outwardly on horizontal cone bearings 16 secured in the upper ends of the two arms 14. The frame 15 has mounted therein the inside lip turning tool 17 which receives a rotary movement by means of a gear 18 on its upper end meshing with a gear 19 on the vertical shaft 9.

The sole is supported, for the operation of the outside and inside lip turning tools 10 and 17, on a rotary support in the form of a flat table 20 carried on a vertical shaft 21 journaled in bearings on a frame 22 which at its top is broadened out and forms a stationary table 23 surrounding the rotary support. The shaft 21 has mounted thereon a beveled gear 24 which meshes with a beveled gear 25 on the forward end of a shaft 26 which projects from the frame 3 in alinement with the shaft 5. The third, and lower, projecting arm 27 on the frame 3 is of a box-like form, and the shafts 5 and 26 are connected within the box by means of the well known Oldham coupling. By means of this coupling the shafts 5 and 26 are rotated in unison but are permitted to slide one past the other. This arrangement is used so that the sole support may be lowered away from the tools to permit the sole to be placed in operating position and removed therefrom after its lip, or lips, are turned. To provide for lowering the sole support the shaft 26 is journaled in the sole support frame 22 and in a sliding block 28 (dotted lines Fig. 1) secured to the frame which block has threaded into its lower end a rod 29 which passes downward through an adjustable bushing 30 within a boss 31 projecting from the column 32 on which the frame 3 is mounted. A coiled spring 33 surrounds the rod 29 and bears against the lower end of the block 28 and the upper end of the bushing 30. To the lower end of the rod 29 there is connected a suitable foot treadle (not shown) through which the rod may be depressed to lower the block 28 and with it the frame 22 in which the sole support is mounted. The upper position of the sole support 20 is suitably determined by an adjustable stop shown as a screw 34 threaded through a lug 35 depending from the frame 22 and adapted to bear, when the sole support is in its raised position, on the lower side of the frame 3.

In order to free the sole from the inside lip turning tool 17 so as to permit its easy removal from the machine, the frame 15 in which this tool is mounted, is swung outwardly at the same time that the sole support is lowered. To effect this result the frame 15 is provided with a rearwardly extending arm 36 from the free end of which there depends a rod 37 which passes down through the box-like projecting arm 27, to one side of the shaft 26, and is provided on its lower end with a collar 38. The sliding block 28 is provided with a lug 39 which extends rearwardly to a position above the collar 38. The rod 37 is also provided with a second collar 40, above the projecting arm 27 of the frame 3, and between this collar and the upper side of the projecting arm there is mounted a coiled spring 41 surrounding the rod. With this construction it will be seen that when the treadle connected to the rod 29 is depressed to lower the sole support the lug 39 will engage the collar 38 and the rod 37 will thus be drawn downwardly and the frame 15 swung outwardly about its bearings 16. It is desirable that the sole support be lowered slightly before the lip turning tool is swung outwardly, and, therefore, the collar 38 is adjustable on the rod 37 so as to provide a space between the collar and the lug 39 whereby the collar is not engaged by the lug to impart movement to the frame 15, until after the sole support has been lowered part way.

All of the parts heretofore described, with the exception of the particular construction of the sole support, are substantially the same as similar parts shown and described in my prior Letters Patent of the United States, No. 940,019, issued November 16, 1909.

The machine illustrated and described in my prior patent just referred to was designed to turn up the lips on what is known as a welt insole sometimes termed a "regular" or a "solid" insole, that is, an insole which is incorporated into the shoe without the application of reinforcing fabric. In the present invention means is provided for setting the up-turned inner lip of a double lipped insole, or the single lip of an insole in which the lip is produced by cutting downwardly and outwardly toward the margin of the sole, in such position that reinforcing fabric can readily be applied to the face of the insole and to the angle at the inner side of the lip. To this end there is provided in the machine, in addition to the lip turning tool, or tools, a lip setting tool which is so mounted, constructed and arranged as to curl the lip on which it acts outwardly over the margin of the sole outside of the channel cut and thus leave the channel unobstructed for the placing of the reinforcing fabric in the vertex of the angle at the base of the channel. The lip setting tool should act on the lip after it has been turned upward by the lip turning tool and, therefore, in the present construction such a tool, shown at 42, has been placed beyond the lip turning tool in the line of feed, the insole being fed in the direction indicated by the arrow in Fig. 2. The lip setting tool 42 is mounted, in a manner presently to be described, in the lower end of a carrier 43 pivotally mounted on the left-hand (viewing Fig. 2) cone bearing 16. The carrier 43 is mounted on the shank of the screw forming the cone bearing by means of a headed sleeve 44 threaded on the bearing screw within the boss formed on the upper end of the carrier. The carrier is provided with a rearwardly extending arm 45 forked at its free end to receive the headed upper end of a depending rod 46 which passes downwardly through a flanged bushing 47 threaded adjustably into a lug 48 projecting from the side of the projecting arm 27 of the frame 3. The rod 46 is surrounded by a coiled spring 49 bearing at its upper end on the head of the rod and at its lower end on the flange of the bushing. The inner position of the lip setting tool 42 under the influence of the spring 49 is determined by an adjustable stop 50 carried by a lug on the carrier 43 and bearing against the swinging frame 15.

The lip setting tool 42 is preferably made in the form of a concaved roll freely rotatable upon a vertically arranged supporting stud 51 held by set screw 52 in one end of a horizontally arranged cylindrical block 53 clamped in the lower end of the carrier 42 which is split and provided with a binding screw for this purpose. By this manner of mounting the lip setting tool 42 it can be adjusted to any desired angle and thus be made to bear on the lip in such manner as to curl it outwardly as is best shown in Fig. 1. In order to provide some means for the lip setting tool 42 to act against there is provided at the rear side of the lip and extending over the margin of the insole an anvil 54 which is mounted on a part 55 of frame 3 rising from the projecting arm 27. Provision for adjusting the anvil toward and from the lip is made by passing set screws, which secure the anvil to the part 55, through slots 56 cut in the shank of the anvil. In order to hold the anvil from movement toward and from the face of the sole a set screw 57 passes downwardly through a lug 58 on the part 55 and bears upon the upper side of the shank of the anvil. The free end of the anvil, that is, the end which abuts against the lip, is provided with a concaved bevel (see Fig. 3) 59 on its upper side into which the lip setting tool 42 fits and against which it presses the lip in the act of curling it outwardly. When operating on a two-lipped insole the anvil also has its free end cut out on its underside, as shown at 60, to cause it to act as an ironing tool for the outer lip and set it over upon the between substance, all as shown in Fig. 1.

Some difficulty has been experienced in turning up and setting the lip along the shank of the insole. The curvature of the channel at this point gives the lip a tendency to fall back over the channel and to prevent this, between the times that the lip is acted on by the lip turning tool and the lip setting tool, there is placed between these two tools a spring finger 61 mounted for vertical adjustment on the frame 15 and acting to hold the lip in its up-turned position just prior to the action thereon by the lip setting tool. In operating upon a two-lipped insole the tendency for the inner lip to return to its position over the channel is accentuated by the action of the anvil 54 in turning the outer lip over the between substance, as the edge of this lip in this operation is forced against and bears with some pressure against the outer side of the inner lip. In this class of work the lip holding tool 61 is especially valuable.

It will be obvious to those skilled in the art that the location of the lip setting tool 42 a short distance beyond the lip turning tool 17 will make it difficult, in fact practically impossible, to turn the lip at the toe of a narrow toed insole if the parts are all rigid. By mounting the carrier 43 yieldingly on its pivot, and it may be here stated that the spring 49 need be only a light spring as no great pressure thereon is necessary to set a lip when in temper, the lip setting roll is permitted to yield outwardly when it reaches the sharp curvature at the toe, while the lip turning tool operates in the narrow end, and after the lip turner starts down the other side of the channel the lip setter again moves back into place behind it. On some extremely pointed shoes, known as "razor toes" the angle of the channel at the toe of the insole is such that it is sometimes desirable to remove the lip setting tool entirely from its working position when operating at this point. There may, therefore, if desired, be connected to the lower end of the rod 46 a block 62 from which there depends a rod or chain 63 connected to a second treadle at the base of the machine. With this last mentioned construction when the second treadle is depressed the lip setting tool 42 may be removed from its operating position by swinging its carrier 43 about the sleeve 44 while the lip turning tool continues in operation.

To assist the rotary sole support in feeding the insole it has been found of advantage to utilize the lower end, that is, the sole engaging end, of one or more of the positively driven rotary lip turning tools. To this end, in the machine shown in the drawings, the bottom face of the outer lip turning tool 10 is provided with a spirally cut nurl 64 shown in dotted lines in Fig. 3. Thus the insole is fed by having its feather gripped between the sole support 20 and the nurled end of the tool 10 the two parts, of course, being rotated in opposite directions as appears from the driving connections illustrated and described.

In operating the machine the lip, or lips, of the channeled insole to be operated upon, are placed in temper by wetting them either by hand or by such a machine as is shown in my prior Letters Patent of the United States, No. 957,961, issued May 17, 1910, and to insert the insole in the machine the treadle connected to the rod 29 is depressed which lowers the sole support 20 and removes all three tools 17, 42 and 61 from their operating position by reason of the outward swinging movement of the frame 15. Having placed the insole in position with the outer side of the lip against the anvil 54 which also acts as a gage, the treadle is released and the tools are brought into operative position as shown in Figs. 1 and 2. With the lip setting tool 42 above the anvil 54 and in position to curl the up-turned lip over upon the anvil, the insole is then passed through the machine as in any lip turning machine, the treadle of the rod 63 being depressed, if extremely pointed toes are being operated upon, at the time the end of the toe is reached, the insole on leaving the machine has its lip properly laid back from the channel to permit a ready application of the reinforcing fabric in the angle at the inside of the lip.

While it is preferred to employ the specific construction and arrangement of parts shown and described since this construction and arrangement is the simplest and most efficient embodiment of the invention which has yet been devised, it should be understood that the invention is not limited to the details of construction and operation of the illustrated embodiment nor to the conjoint use of all its features but may be embodied in other features within the terms and scope of the claims.

What is claimed as new is:

1. A machine for operating on insoles provided with a lip produced by a downward and outward marginal cut, having in combination, a sole support, and a lip setting tool constructed and arranged to bear on the inner side of the lip and curl it outwardly over the margin of the insole outside the marginal cut, substantially as described.

2. A machine for operating on insoles provided with a lip produced by a downward and outward marginal cut, having in combination, a sole support, a rotary lip turning tool, and a lip setting tool arranged to bear on the inner side of the lip and beyond the lip turning tool in the line of feed, substantially as described.

3. A machine for operating on insoles provided with a marginal lip, having, in combination, a sole support, a lip turning tool, a lip setting tool beyond the lip turning tool, and a lip holding device between said tools, substantially as described.

4. A machine for operating on insoles provided with a lip produced by a downward and outward marginal cut, having, in combination, a sole support, a lip setting tool, constructed and arranged to bear on the inner side of the lip and curl it outwardly over the margin of the insole inside the marginal cut, and an anvil outside the lip over which the lip is curled by the lip setting tool, substantially as described.

5. A machine for operating on insoles provided with a lip produced by a downward and outward marginal cut, having, in combination, a sole support, and a lip setting tool arranged to bear on the inner side of the lip comprising a concaved roll set angularly against the lip arranged to curl the lip outwardly over the margin of the insole outside the marginal cut, substantially as described.

6. A machine for operating on insoles provided with a lip produced by a downward and outward marginal cut, having, in combination, a sole support, a lip setting tool arranged to bear on the inner side of the lip comprising a concaved roll set angularly against the lip arranged to curl the lip outwardly over the margin of the insole outside the marginal cut, and provision for varying the angularity of the roll with relation to the lip, substantially as described.

7. A machine for operating on insoles provided with a lip produced by a downward and outward marginal cut, having, in combination, a sole support, a lip setting tool constructed and arranged to bear on the inner side of the lip and curl it outwardly over the margin of the insole outside the marginal cut, and means for holding said tool yieldingly against the lip, substantially as described.

8. A machine for operating on insoles provided with a lip produced by a downward and outward marginal cut, having, in combination, a sole support, a lip setting tool constructed and arranged to bear on the inner side of the lip and curl it outwardly over the margin of the insole outside the marginal cut, means to hold said tool yieldingly inward, and an adjustable stop to determine its inward position, substantially as described.

9. A machine for operating on insoles provided with a lip produced by a downward and outward marginal cut, having, in combination, a sole support, a lip turning tool, a lip setting tool arranged to bear on the inner side of the lip beyond the lip turning tool, and means for removing the lip setting tool from its operative position while the lip turning tool continues in operation, substantially as described.

10. A machine for operating on insoles provided with a lip produced by a downward and outward marginal cut, having, in combination, a sole support, a lip turning tool, a lip setting tool arranged to bear on the inner side of the lip beyond the lip turning tool, and means for concurrently lowering the sole support and removing both the turning and setting tools from operative position, substantially as described.

11. A machine for operating on insoles, having, in combination, a positively driven rotary flat table for supporting and feeding the insole, and a positively driven rotary lip turning tool opposite the table having a spirally cut nurl in its lower end which engages and grips the feather of the insole between the tool and table to assist the table in feeding, substantially as described.

12. A machine for operating on insoles provided with a lip produced by a downward and outward marginal cut, having, in combination, a sole support, a tool constructed and arranged to turn the lip into substantially upright position, and a tool beyond said lip turning tool in the line of feed having an acting face oblique to the face of the insole arranged to engage the inner face of the upturned lip and curl it outwardly, substantially as described.

13. A machine for operating on insoles provided with a marginal lip, having, in combination, a sole support, two rotary tools acting successively to first raise the lip and then set it in a position raised from the insole, and an anvil adjacent the lip against which the lip is pressed by the setting tool, substantially as described.

14. A machine for operating on insoles provided with a marginal lip, having, in combination, a sole support, a rotary lip turning tool mounted on an axis substantially normal to the sole support, and a rotary lip setting tool mounted on an axis inclined to the sole support, substantially as described.

15. A machine for operating on insoles provided with a marginal lip, having, in combination, a sole support, and two conically shaped lip turning and lip setting rolls, the former having its larger base opposed to the sole support, and the latter having its smaller base opposed to the sole support, substantially as described.

WILLIAM H. HOOPER.

Witnesses:
WARREN G. OGDEN,
BURTON W. CARY.

Copies of this patent may be obtained for five cents each, by addressing the "Commissioner of Patents, Washington, D. C."